(No Model.)
D. L. KULP & L. D. GERWIG.
SPOON HOLDER.
No. 549,922. Patented Nov. 19, 1895.
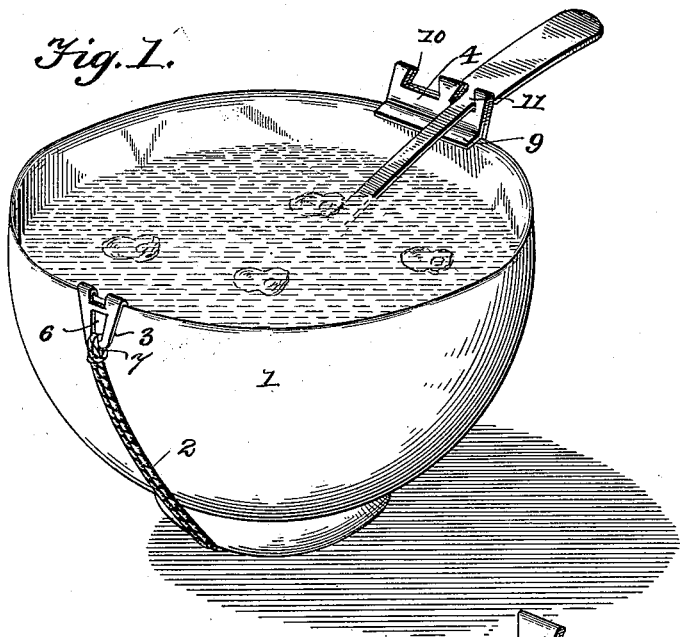
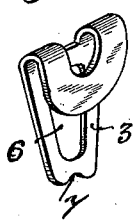
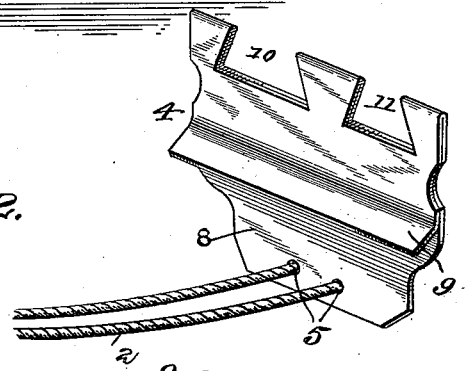
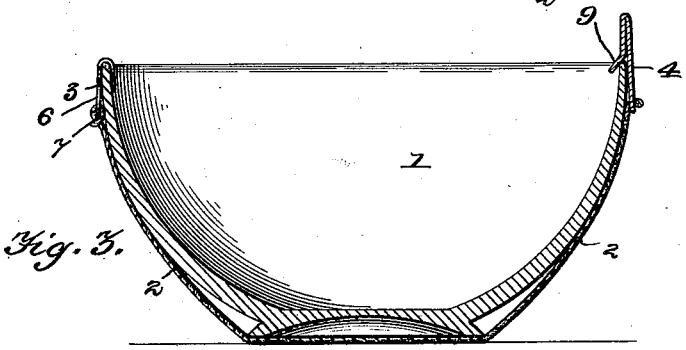
Witnesses
E. H. Monroe
Inventors
Daniel L. Kulp.
Lewis D. Gerwig
By their Attorneys,
C. A. Snow & Co.

UNITED STATES PATENT OFFICE.

DANIEL L. KULP AND LEWIS D. GERWIG, OF POTTSTOWN, PENNSYLVANIA.

SPOON-HOLDER.

SPECIFICATION forming part of Letters Patent No. 549,922, dated November 19, 1895.

Application filed August 14, 1894. Serial No. 520,308. (No model.)

*To all whom it may concern:*

Be it known that we, DANIEL L. KULP and LEWIS D. GERWIG, citizens of the United States, residing at Pottstown, in the county of Montgomery and State of Pennsylvania, have invented a new and useful Spoon-Holder, of which the following is a specification.

This invention has for its purpose to produce a more efficient and desirable device for holding spoons and other table utensils on the edge of a plate or dish and for preventing them from falling down into the bottom thereof. This end we attain by certain peculiar features of construction and combination of parts, as will be more fully described hereinafter and finally embodied in the claim.

In the accompanying drawings, Figure 1 represents a perspective view of our improvement, showing it applied to a bowl or dish; Fig. 2, an enlarged perspective of the improvement, the same being shown detached from the bowl or dish; Fig. 3, a sectional view taken through the device while attached to the dish as in Fig. 1; Fig. 4, a detail perspective of the hook for attachment to the edge of the dish or bowl.

The reference-numeral 1 indicates the dish, which may be of any construction, and which is shown to be filled with food.

Our improvement consists, essentially, of three parts—the elastic cord 2, having the hook 3 at one end and the spoon-retaining plate 4 at the other end.

The elastic cord 2 is knotted at its ends, so as to be practically continuous, it having been first passed through the openings 5 in the retaining-plate 4. The hook 3 is connected to the cord 2 by looping the said cord through the opening 6 thereof. This hook 3 is preferably formed of plate-steel and may be perforated or cut away to reduce its weight, if so desired. The opening 6 is formed in the shank portion of the hook, and the lower end of such shank is formed with an indentation 7, which has for its purpose to receive the looped knot of the cord 2, thereby forming a neat connection between the two parts. The hook 3 is adapted to pass over the edge of the bowl or dish 1, while the plate 4 is adapted to be secured to the same edge at diametrically-opposite sides. The plate 4 is formed of an integral plate of steel with the downwardly-extending portion or shank 8, in which the openings 5 aforesaid are formed. Above the shank 8 the plate is bent back upon the main portion, and the end of the plate is curved outwardly to form the lip 9, which is adapted to take over the edge of the dish or bowl 1 and thereby connect the plate to the dish.

Formed in the upper edge of the plate 4, or that edge which has been bent, are the dovetailed indentations 10 and 11. The opening 10 is larger than its companion and is adapted, primarily, for the reception of a knife; while the opening 11 is primarily adapted to receive a spoon, as shown in Fig. 1. It is possible, however, to depart from this preferred adaption and to use the indentation 10 for whatever purpose that may be convenient.

In the use of the invention the cord 2 is connected to the hook 3 and to the plate 4 and these two parts hooked over the opposite edges of the dish or bowl, as shown in Fig. 1. The elasticity of the cord will operate to draw the hook and plate tightly down over the edges of the dish, thus holding them snugly in place. When a person has finished using the spoon or other utensil, he may deposit the handle thereof in one of the indentations 10 or 11, which will hold the same secure.

It will be observed that the essence of our invention lies in the elastic cord 2, together with the peculiar construction of the plate 4 and hook 3. By means of the cord the plate and hook are drawn and held securely and immovably in place, while the peculiar construction of the plate 4 aids materially in the effective holding of the utensil and permits the free and easy action of the operator.

Having thus described the invention, we claim—

In a spoon holder attachment, a spoon retaining plate adapted to rest loosely upon the rim of a dish and made from a sheet metal blank, the same being folded upon and against itself and provided with a notch in the folded edge for the reception of a spoon and having its inside terminal edge offset to form a shoulder or lip for engaging the rim of the dish and regulating the position of the plate thereon, in combination with an elastic cord connected to the retaining plate, and a hook connected to the elastic cord and engaging the rim of the dish at a point diametrically opposite, the cord being passed under the dish, substantially as described.

In testimony that we claim the foregoing as our own we have hereto affixed our signatures in the presence of two witnesses.

DANIEL L. KULP.
LEWIS D. GERWIG.

Witnesses:
WM. C. SPORE,
HARRY H. TROUT.